April 21, 1959
J. H. PRICHARD ET AL
2,883,301
MAGNETIC RECORDING TAPE
Filed Aug. 17, 1955
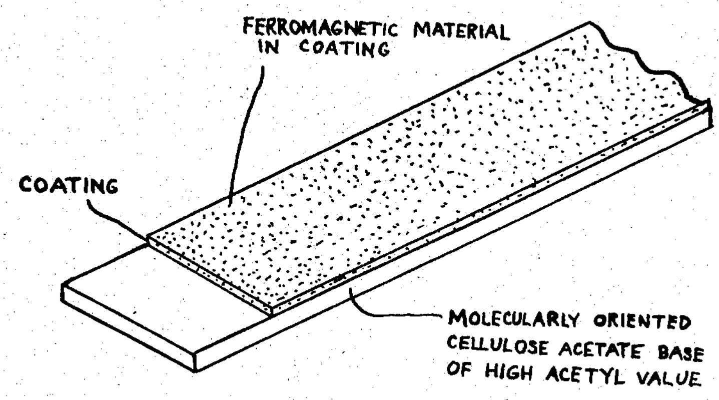
INVENTORS:
JOHN H. PRICHARD
FRANCIS J. RIELLY
FRANK BROWN
BY Felix Klaus and Abner Sheffer
ATTORNEYS United States Patent Office 2,883,301

Patented Apr. 21, 1959

2,883,301

MAGNETIC RECORDING TAPE

John H. Prichard, Springfield, Francis J. Rielly, Chatham, and Frank Brown, Summit, N.J., assignors to Celanese Corporation of America, New York, N.Y., a corporation of Delaware Application August 17, 1955, Serial No. 529,071

12 Claims. (Cl. 117—7)

This invention relates to magnetic recording tapes and relates more particularly to magnetic recording tapes having a basis of stretched cellulose acetate of high acetyl value.

The magnetic recording tapes in use at present generally consist of a plastic base coated with a dispersion of a ferromagnetic material. These tapes find wide use in the recording of sound, but have also been employed for the recording of visual images such as television programs, and for the recording of other information, as in electronic computers. Most commonly, the plastic base of such tapes is composed of cellulose acetate having a combined acetic acid content of about 53 to 55% and contains a minor proportion of a plasticizer such as diethyl phthalate.

To give entirely satisfactory reproduction, a magnetic recording tape must be dimensionally stable to variations in temperature and humidity and must not undergo a large elongation, particularly a large permanent elongation, when it is drawn through a recording device under tension. Of course, the tape should be sufficiently strong and flexible so that it may be passed through the recording device at relatively high speeds.

It is therefore an object of this invention to provide a novel magnetic recording tape of improved dimensional stability to variations in temperature and humidity, which tape has high strength and undergoes very little, if any, permanent deformation when drawn through a recording device.

Other objects of this invention will be apparent from the following detailed description and claims. In this description and claims all proportions are by weight unless otherwise indicated.

In accordance with this invention there is provided a magnetic recording tape comprising a coating of a dispersion of a ferromagnetic material supported on a base comprising a stretched cellulose acetate having a combined acetic acid content of at least 60%, e.g. 60 to 62%, preferably 61.0 to 61.8%. The tape of this invention has good dimensional stability and very high breaking strength. Its yield strength is so high as to be substantially the same as its breaking strength. That is, the tape can be placed under a tension almost equal to its breaking strength without undergoing permanent deformation.

The magnetic recording tape of this invention is preferably produced by first forming a film of the cellulose acetate of high combined acetic acid content, then stretching said film and thereafter coating the stretched film with a suitable composition comprising a dispersed ferromagnetic material and a vehicle therefor. The coated film may then be slit to the desired width (e.g. 0.25 to 0.75 inch) to form a tape. If desired, the film of cellulose acetate of high acetyl value may instead be slit to tape width before or during the stretching thereof or it may be slit after the stretching but before the coating thereof.

In order to avoid brittleness, the cellulose acetate of high combined acetic acid content should contain a minor amount of a plasticizer therefor, such as a compatible phthalate or phosphate ester, e.g. triphenyl phosphate, cresyl diphenyl phosphate, dibutyl phthalate, trichlorethyl phosphate, or dimethoxyethyl phthalate. The precise amount of plasticizer will depend on the flexibility desired, a suitable range being 10 to 20% based on the weight of cellulose acetate. Conveniently, the cellulose acetate and plasticizer are mixed with a mutual solvent such as methylene chloride, alone or in admixture with a lower aliphatic alcohol such as methanol, ethanol, propanol or butanol, or in admixture with two or more of said alcohols. The resulting solution, or dope, is cast on a suitable surface such as casting wheel and the solvent allowed to evaporate to form a film, after which the film is stripped from the casting surface.

The stretching of the film of cellulose acetate of high acetyl value is preferably carried out while said film is at an elevated temperature, e.g. about 60 to 100° C. The film is then allowed to cool while it is maintained in the stretched condition. The degree of stretching should be sufficient to substantially increase the tensile strength and decrease the elongation at break of the film as measured in the direction of stretching. Under the above temperature conditions a stretch of about 15 to 25% is very suitable. Preferably, the extent of stretching is such that the yield point of the material is increased to within about 5% of its ultimate tensile strength. Thus, when a film 1.5 mil in thickness and composed of 87% of cellulose acetate, having a combined acetic acid content of 61.4% and an intrinsic viscosity of 2.1, and 13% of triphenyl phosphate is heated to a temperature of 66° C. and stretched 20.8% and allowed to cool in stretched condition, its ultimate strength is increased from 9.7 kg./mm.$^2$ to 14.9 kg./mm.$^2$, while its yield strength is increased from 7.8 kg./mm.$^2$ to 14.9 kg./mm.$^2$. Here the yield strength is the same as the ultimate strength so that the material does not become deformed permanently and irreversibly before it breaks. At the same time its elongation at break is reduced from 26.7% to 7.3% and its elongation under stress, as measured in accordance with Federal Specification W–T–61*a*, is reduced to zero.

While uniaxial stretching is most convenient, the film may also be stretched in two directions perpendicular to each other, if a less anisotropic material is desired. Preferably, the stretching is carried out continuously as by passing the film continuously through a heating chamber and then between pairs of draw rolls driven at such speeds relative to each other as to impart the desired stretch to the film.

The application of the magnetic coating to the stretched film of cellulose acetate of very high acetyl value may be carried out in any conventional manner. For example, there may be employed the materials and procedures described in U.S. Patent No. 2,633,431. Generally, the coating composition used comprises a suspension of magnetic iron oxide in a vehicle containing a volatile solvent and a cellulose derivative or resin or both. To insure uniformity of the coating, several layers of the coating composition are applied successively, the coating being allowed to dry after each application.

The following example is given to illustrate this invention further.

*Example*

A film 1.5 mils in thickness and composed of 87% of cellulose acetate, having a combined acetic acid content of 61.4%, and 13% of triphenyl phosphate is heated to 66° C., stretched 20.8% and allowed to cool while in stretched condition. The film is then coated with a composition comprising 65% of magnetic iron oxide, 20% of polyvinyl acetal, 10% of cellulose nitrate (alcohol-soluble) and 5% of plasticizer dispersed in a volatile solvent. The film is then slit into ¼ inch widths for use as magnetic recording tape.

The accompanying drawing shows, in perspective and on an enlarged scale, a short length of such tape. The molecularly oriented cellulose acetate of high acetyl value serves as a base for the coating which contains the ferromagnetic material.

It is to be understood that the foregoing detailed description is given merely by way of illustration and that many variations may be made therein without departing from the spirit of our invention.

Having described our invention what we desire to secure by Letters Patent is:

1. Magnetic recording tape comprising molecularly oriented cellulose acetate having a combined acetic acid content between 60.0 and 62.0%, and having a coating of a ferro-magnetic material.

2. Magnetic recording tape comprising molecularly oriented cellulose acetate having a combined acetic acid content of at least 60%, and a minor amount of a plasticizer therefor, said stretched cellulose acetate having a coating of a ferromagnetic material in a binder for said material.

3. Tape as set forth in claim 2 in which said ferromagnetic material is a magnetic iron oxide.

4. A magnetic recording tape comprising a coating of ferromagnetic material on a base of molecularly oriented cellulose acetate having a combined acetic acid content of at least 60% and a yield strength within about 5% of its ultimate strength.

5. Tape as set forth in claim 4 in which the yield strength is about 14.9 kg. per sq. mm. and the base of cellulose acetate contains a minor amount of plasticizer.

6. Magnetic recording tape comprising a coating of ferromagnetic material in a binder for said material on a base of cellulose acetate having a combined acetic acid content of at least 60% and 10 to 20% of a plasticizer and having a yield strength within about 5% of its ultimate strength.

7. A film of molecularly oriented cellulose acetate having a combined acetic acid content of at least 60%, said film having a minor amount of plasticizer and a yield strength within about 5% of its ultimate strength.

8. A film of cellulose acetate according to claim 7, said film having a yield strength of about 14.9 kg. per sq. mm.

9. A stretched, molecularly oriented film of cellulose acetate having a combined acetic acid content of at least 60%, having an ultimate tensile strength of at least about 14.9 kg. per sq. mm.

10. Process which comprises stretching a film of cellulose acetate having a combined acetic acid content of at least 60%, at a temperature of about 60 to 100° C. and cooling said film in stretched condition to produce a film having a high ultimate tensile strength and a high yield strength within about 5% of its ultimate tensile strength.

11. Process according to claim 10 in which the material is stretched about 15 to 25 percent.

12. Process which comprises stretching at a temperature of 60 to 100° C. for an increase in dimension of about 15 to 25% a film of cellulose acetate containing a minor amount of a plasticizer therefor, said cellulose acetate having a combined acetic acid content of at least 60%, cooling the film in stretched condition, and then coating the film with a composition comprising a ferromagnetic material in a binder therefor.

References Cited in the file of this patent

UNITED STATES PATENTS

| | | |
|---|---|---|
| 1,808,998 | Sheppard et al. | June 9, 1931 |
| 2,236,648 | Nagel et al. | Apr. 1, 1941 |
| 2,512,490 | Drisch et al. | June 20, 1950 |
| 2,547,763 | Land et al. | Apr. 3, 1951 |

FOREIGN PATENTS

| | | |
|---|---|---|
| 954,244 | France | Dec. 21, 1949 |